(No Model.)
A. WOMACK.
ROAD SCRAPER.
No. 282,141. Patented July 31, 1883.
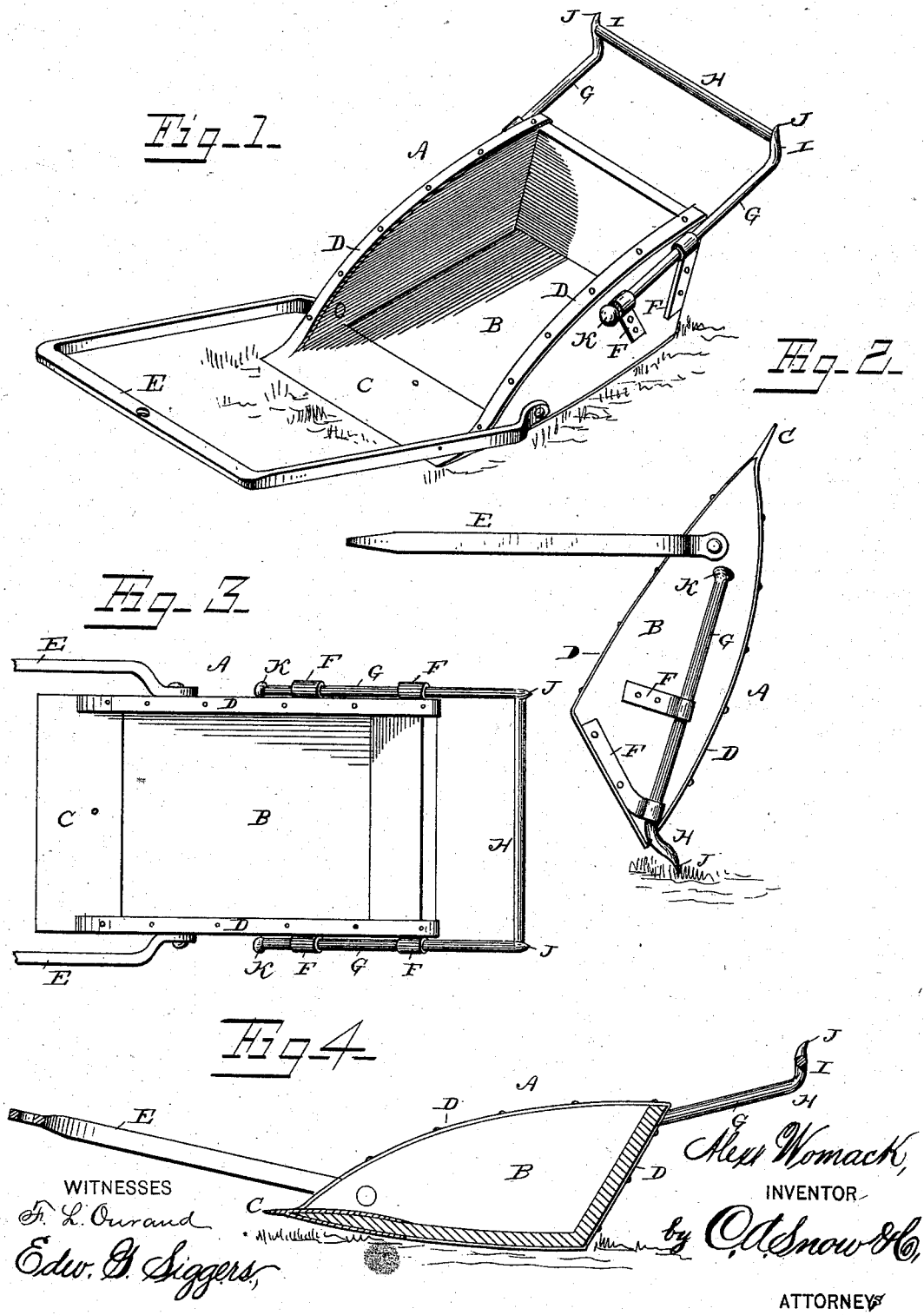

UNITED STATES PATENT OFFICE.

ALEXANDER WOMACK, OF EMMETTSVILLE, IDAHO TERRITORY.

ROAD-SCRAPER.

SPECIFICATION forming part of Letters Patent No. 282,141, dated July 31, 1883.

Application filed February 28, 1883. (No model.)

*To all whom it may concern:*

Be it known that I, ALEXANDER WOMACK, a citizen of the United States, residing at Emmettsville, in the county of Ada and Territory of Idaho, have invented a new and useful Road-Scraper, of which the following is a specification, reference being had to the accompanying drawings.

This invention relates to road-scrapers; and it consists in certain improvements in the construction of the same, which will be hereinafter fully described, and particularly pointed out in the claims.

In the drawing hereto annexed, Figure 1 is a perspective view of my improved road-scraper in position for loading. Fig. 2 is a side view, showing the same dumped and in the act of returning. Fig. 3 is a top view, and Fig. 4 is a longitudinal vertical sectional view.

The same letters refer to the same parts in all the figures.

A in the drawings designates the body of the scraper, which is constructed in any suitable well-known manner, consisting, mainly, of the trough or box B, having a scraping-edge, C, and bound or shod with straps D.

E is a bail pivoted to the sides of the scraper-box, near the front end of the same, and of such a size that the entire scraper-box may turn through the said bail, to the front end of which the draft is, in practice, attached. The sides of the scraper-box are provided with loops or brackets F F, to receive the arms G G of a bail, H, which slides longitudinally in the said loops. The rear end of said bail is turned upwardly at I, and provided with sharp points J. The front ends of the arms of the bail have knobs K, to prevent the bail from sliding out of its bearings.

In operation the bail is slid or moved back to its utmost extent, draft is attached to the bail E, and the rear end of bail H serves as a handle for manipulating the scraper while being loaded. When the box has been filled and drawn to the dumping-place, the bail H serves as a lever for tilting the box, which is thus readily overturned or dumped by the continued draft. In the act of dumping or overturning the box the bail H slides, by its own weight, in a forward direction upon the scraper-box, and the sharp points J catch in the ground, thus causing the box to be again overturned or reversed to its original position. The bail H is then again drawn out or in a rearward direction, and serves as a handle, as before.

This device is exceedingly simple and convenient, and may be manufactured at a small expense.

I claim as my invention and desire to secure by Letters Patent of the United States—

1. In a road-scraper, the combination, with the scraper-box, of a longitudinally-sliding bail, forming a handle, and having upturned rear end equipped with sharp points, as and for the purpose herein set forth.

2. In a road-scraper, the combination of the scraper-box, a bail pivoted to the sides of the same near the front end, and through which the said scraper-box may turn, a longitudinally-sliding bail having upturned rear end, forming a handle, and sharp points projecting upwardly from the rear end of said bail, as and for the purpose herein shown and specified.

In testimony that I claim the foregoing as my own I have hereto affixed my signature in presence of two witnesses.

ALEXANDER WOMACK.

Witnesses:
DORA P. DELANO,
ISAAC J. WOMACK.